United States Patent [19]
Grudzien, Jr.

[11] Patent Number: 5,811,685
[45] Date of Patent: Sep. 22, 1998

[54] FLUID PRESSURE SENSOR WITH CONTAMINANT EXCLUSION SYSTEM

[75] Inventor: Christopher P. Grudzien, Jr., Mansfield, Mass.

[73] Assignee: MKS Instruments, Inc., Andover, Mass.

[21] Appl. No.: 763,020

[22] Filed: Dec. 11, 1996

[51] Int. Cl.⁶ .................. G01L 7/08; G01L 9/12
[52] U.S. Cl. .................. 73/724; 73/715; 73/726
[58] Field of Search .................. 96/173, 207; 95/17, 95/288; 55/267; 210/335, 90, 456; 73/715–746

[56] References Cited

U.S. PATENT DOCUMENTS

| | | | |
|---|---|---|---|
| 533,136 | 1/1895 | Miller | 210/335 |
| 1,700,449 | 1/1929 | Reily | 73/715 |
| 3,231,091 | 1/1966 | Kingsbury et al. | 210/335 |
| 4,177,496 | 12/1979 | Bell et al. | 73/724 X |
| 4,562,742 | 1/1986 | Bell | 73/724 X |
| 4,785,669 | 11/1988 | Benson et al. | 73/718 |
| 5,515,711 | 5/1996 | Hinkle | 73/4 V |

*Primary Examiner*—Joseph L. Felber
*Attorney, Agent, or Firm*—Lappin & Kusmer LLP

[57] ABSTRACT

A variable capacitance fluid pressure sensor of the type which includes a deflectable member includes a contaminant exclusion system which protects the deflectable member from both solid and non-solid fluid-borne contaminants. A system of traps disposed between the fluid inlet to the sensor and the deflectable member prevents deposition of process vapors in the fluid on the deflectable member and collects a variety of sizes of fluid-borne solid contaminants remote from the deflectable member.

19 Claims, 4 Drawing Sheets

FLUID PRESSURE SENSOR WITH CONTAMINANT EXCLUSION SYSTEM

TECHNICAL FIELD present invention relates to fluid pressure sensors, and more particularly to variable capacitance fluid pressure sensors which include a deflectable member, such as a metal foil or diaphragm, which deflects in response to impingement of fluid against it and thus provides a signal representative of the fluid pressure.

BACKGROUND OF THE INVENTION

A variable capacitance fluid pressure sensor typically includes a housing and a pair of electrically conductive plates, one of which is moveable relative to the other in response to fluid pressure against it. The moveable plate is typically a thin metal foil or diaphragm which deflects in response to fluid impingement against it, thus changing the relative distance between it and the fixed plate. The term "deflectable member", as used herein, refers to a deflectable metal foil or diaphragm as described above. An electrical signal representative of the deflection of the moveable plate is generated by a transducer. A fluid inlet element defines a passageway for admission of a fluid into the housing and to the deflectable member. The sensor includes an element for detecting the deflection of the deflectable member in response to impingement of the fluid against it and for generating signals representative of the pressure of the fluid on the deflectable member. Such sensors are capable of measuring fluid pressures in the range of less than 1000 mm Hg.

The behavior of the deflectable member is influenced by the presence of both solid and liquid contaminants within the fluid. For example, solid particulate contaminants can lodge beneath the deflectable member or between it and the wall of the sensor housing, thereby displacing or dislodging the deflectable member to a relatively small, yet potentially significant, extent. In some instances a particulate contaminant can even pierce the deflectable member, rendering the sensor inoperable. In other instances, deposition of a vapor on the deflectable member can increase its effective mass and thus adversely affect its ability to deflect in response to fluid pressure upon it. In addition, if the deflectable member is visible or otherwise directly accessible from the exterior of the sensor, it can be inadvertently damaged by probes or other external contaminants that can enter the sensor.

It is known to employ a baffle, screen or similar device at the fluid entrance to the sensor, as shown in FIG. 1, in order to protect the deflectable member to some extent from fluid-borne contaminants. Such devices are disadvantageous, however, because they can become clogged by both solid particulate matter and process vapor residues from the fluids being measured. The clogged screens change the conductance of the fluid and therefore must be regularly removed and cleaned or replaced, necessitating the bypassing and removal of the sensors from the process equipment. In addition, the baffle shown in FIG. 1 has relatively large openings for the passage of fluid therethrough and thus does not adequately prevent fluid-borne contaminants from reaching the deflectable member within the sensor.

As an alternative to the baffle, some sensors are designed with a relatively large volume for the fluid to be measured, so that solid contaminants in the fluid do not penetrate the sensor sufficiently to reach the deflectable member. However, the use of relatively large fluid volumes in the sensor is disadvantageous because relatively long times are required to evacuate the process lines, thus slowing the fluid measurement process.

It would therefore be an advantage in the art to provide a fluid pressure sensor which excludes both solid and non-solid fluid-borne contaminants without the disadvantages of the prior art systems.

OBJECTS OF THE INVENTION

It is therefore an object of the present invention to provide a fluid pressure sensor of the deflectable diaphragm type which has an increased useful life, because the deflectable diaphragm is shielded from solid and non-solid fluid-borne contaminants.

Another object of the present invention is to provide a fluid pressure sensor of the deflectable diaphragm type in which the deflectable diaphragm is not visible or otherwise directly accessible from the exterior of the sensor.

Still another object of the invention is to provide a fluid pressure sensor in which the deflectable member is shielded from process vapor deposition, and in which the location and extent of vapor deposition is controlled.

And yet another object of the invention is to provide a fluid pressure sensor in which solid particulate contaminants of various sizes are trapped and collected remote from the deflectable diaphragm.

And still another object of the invention is to provide a fluid pressure sensor in which fluid-borne contaminants are excluded from the interior of the sensor without adversely affecting the fluid conductance through the sensor.

SUMMARY OF THE INVENTION

The variable capacitance fluid pressure sensor of the present invention includes a pair of electrically conductive plates, one of which is fixed and other of which is moveable relative to the fixed plate. The moveable plate is made of a thin foil or other deflectable member which deflects in response to impingement of fluid against it. The deflectable member is connected to a transducer which converts the deflection of the foil to an electrical signal. Deflection of the deflectable member changes the electrical capacitance of the plates and the signals therefrom and is thus a measure of the pressure of the fluid in the sensor.

The fluid pressure sensor of the present invention includes a contaminant exclusion system which protects the deflectable member inside the sensor from both solid and non-solid (i.e., vaporous) contaminants in the fluid being measured. Such contaminants, if in contact with the deflectable member, restrict its movement or otherwise adversely affect its behavior in response to fluid pressure by increasing the weight of the deflectable member or by becoming wedged between the deflectable member and the housing.

The contaminant exclusion system of the present invention includes various components in the fluid path of the sensor which are designed to collect or trap solid contaminants having a size of approximately 250 micrometers and larger in diameter. In addition, the system includes a process vapor deposition inducing element which induces preferential and controlled deposition of the process vapor near the entrance of the fluid into the sensor such that vapors do not condense on or near the deflectable member.

According to one aspect of the present invention, a system for shielding the deflectable member from contaminants in the fluid comprises a first contaminant collecting element near the fluid inlet to the sensor for collecting relatively large solid contaminants, a second contaminant collecting element between the fluid inlet and the deflectable member for collecting solid contaminants of an intermediate size, and a third contaminant collecting element near the deflectable member for collecting relatively small solid contaminants.

The first contaminant collecting element comprises an annular channel surrounding, and in fluid communication with, the fluid inlet. In a preferred embodiment, the maximum dimension, or height, of the entrance to the annular channel from the fluid inlet is small relative to the maximum dimension, or diameter, of the entrance to the fluid inlet.

The second contaminant collecting element comprises a baffle element disposed in the fluid path between the fluid inlet and the deflectable member, and a trap element surrounding, and in fluid communication with, the fluid inlet. In a preferred embodiment, the baffle element includes a central baffle portion and a peripheral conductance portion, wherein the diameter of the central baffle portion is at least as great as the diameter of the fluid inlet. Fluid impinging on the central baffle portion is thus prevented from impinging directly on the deflectable member.

The peripheral conductance portion of the baffle element comprises a circumferential region which includes a plurality of radially spaced apertures therein. The apertures in the conductance portion of the baffle element permit passage of fluid therethrough and have a radial dimension which is at least as great as the thickness of the central baffle portion. In a preferred embodiment, the radial dimension of the apertures is not greater than approximately 250 micrometers.

The trap element is in direct fluid communication with the annular channel, which is in direct fluid communication with the fluid inlet. The trap element is adapted for collecting solid contaminants which have a minimum dimension that is greater than the radial dimension of the apertures in the conductance portion of the baffle element.

The third contaminant collecting element is disposed near the deflectable member and diverts relatively small solid contaminants away from the deflectable member. In a preferred embodiment, a portion of the housing between the deflectable member and the fluid inlet slopes away from the deflectable member, thus forming an obtuse angle relative to the plane of the deflectable member. The angle between the housing and the deflectable member is preferably about 98 degrees.

The contaminant exclusion system of the present invention can further include a process vapor deposition inducing element which is removably disposed within the fluid inlet. The process vapor deposition inducing element induces deposition of process vapors in the fluid preferentially in the fluid inlet instead of on the deflectable member.

In a preferred embodiment, the process vapor deposition inducing element comprises one or more deposition matrices removably disposed within the fluid inlet. The deposition matrices have respective deposition surfaces and include a plurality of apertures adapted to permit passage of the fluid therethrough. The deposition matrices may be part of an electrical circuit which includes, or example, a plurality of sensors for sensing the temperature of the fluid, the fluid inlet, the deposition matrices, and the deflectable member, and a controller for controlling the amount of current through, and thus the amount of heat energy to, the deposition matrices. A separate heater may also be supplied. The deposition surfaces of the deposition matrices are maintained at a temperature which is less than the temperature of the fluid flowing therethrough and less than the temperature of the deflectable member within the sensor. In particular, the temperature of the deposition surfaces is sufficiently low, relative to the temperature of the fluid and of the deflectable member, to induce deposition of process vapors in the fluid onto the deposition surfaces of the deposition matrices instead of onto the deflectable member.

These and other objects and advantages of the invention will in part be obvious and will in part appear hereinafter. The invention accordingly comprises the apparatus possessing the construction, combination of elements and arrangement of parts which are exemplified in the following detailed disclosure, the scope of which will be indicated in the claims.

BRIEF DESCRIPTION OF THE DRAWINGS

For a fuller understanding of the nature and objects of the present invention, reference should be had to the following detailed description taken in connection with the accompanying drawings, in which.

DETAILED DESCRIPTION OF THE DRAWINGS

Figure 1:
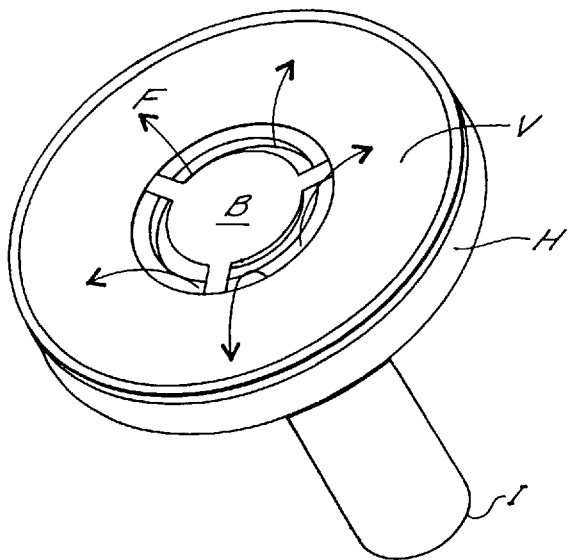
FIG. 1 is a perspective view of a portion of a prior art pressure sensor.

The contaminant exclusion system of the present invention is disposed inside a portion of a variable capacitance fluid pressure sensor, specifically, between the fluid inlet to the sensor and the deflectable member within the sensor. FIG. 1 illustrates a portion of a prior art pressure sensor, which comprises a fluid inlet I, a housing H defining an interior fluid volume V, and a baffle B disposed between the fluid inlet I and the diaphragm or deflectable member (not shown). As shown, a typical prior art baffle B comprises a disk-shaped hub with three radial spokes by which the baffle is mounted to the housing. Fluid passing into the fluid inlet I, although deflected by the baffle B, passes freely through the relatively large openings between the spokes, as indicated by the arrows F. The relatively large size of these openings in the baffle render it a poor shield for the diaphragm, as relatively large fluid-borne contaminants are able to reach, and thus adversely affect the behavior of, the diaphragm.

Figure 2:
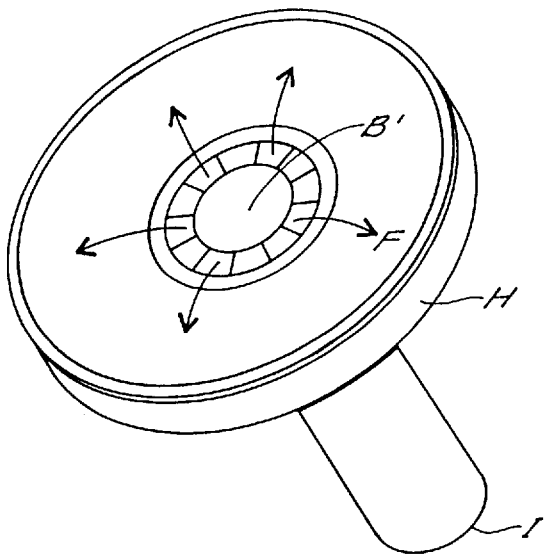
FIG. 2 is a perspective view of a portion of a pressure sensor which includes a contaminant exclusion system according to the present invention.

FIG. 2 illustrates a portion of a pressure sensor which includes a contaminant exclusion system according to the present invention. The baffle B has been replaced with a baffle element B', described in greater detail below. The fluid conductance through this baffle element B' is at all times at least as great as the fluid conductance through the prior art baffle B.

Figure 3:
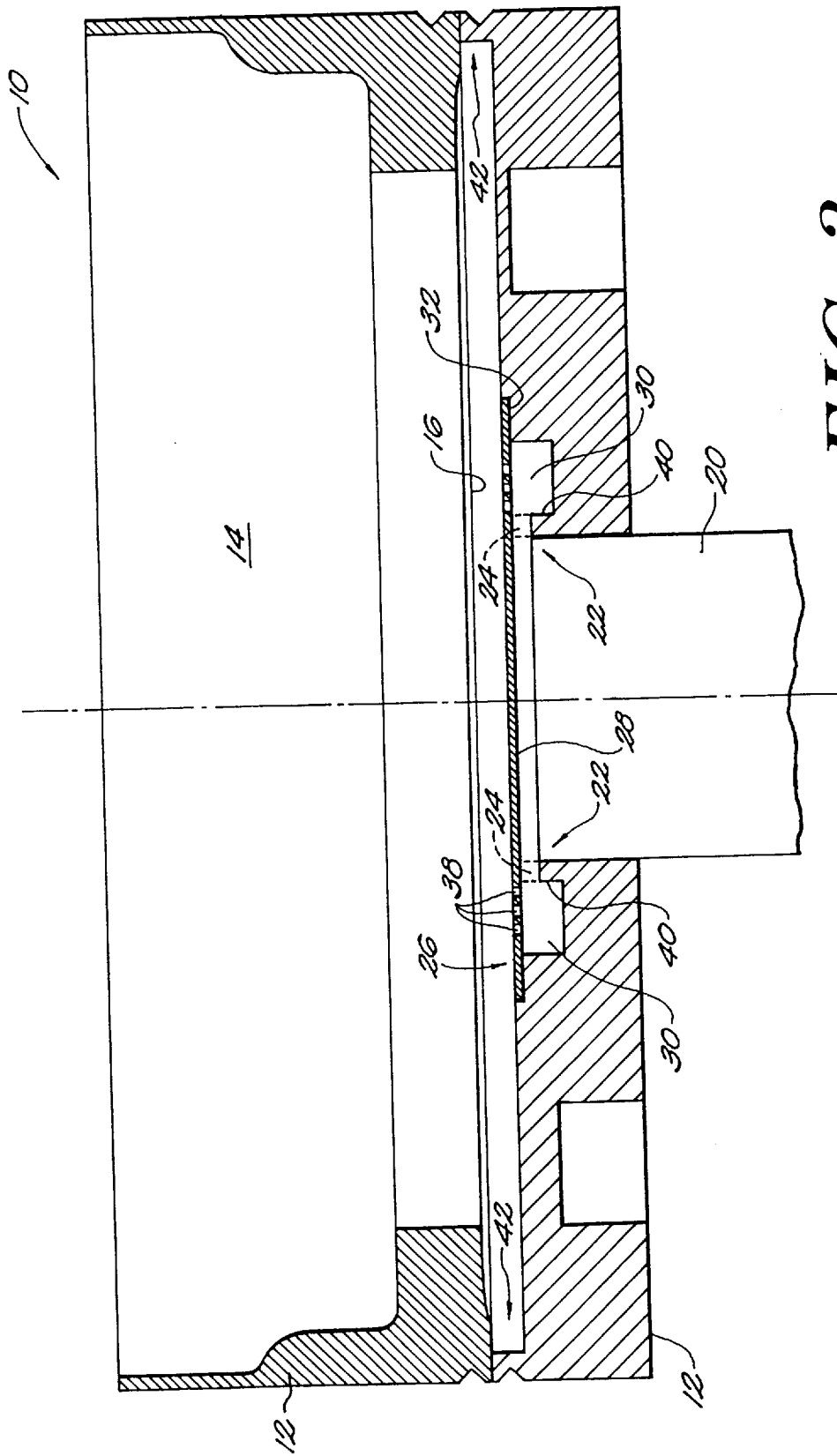
FIG. 3 is a cross-sectional illustration of the contaminant exclusion system according to one aspect of the invention.

Additional features of the contaminant exclusion system of the present invention are shown most clearly in FIG. 3, which illustrates, in simplified cross-section, a variable capacitance fluid pressure sensor 10. The sensor 10 includes a housing 12 which defines an interior volume 14 for fluid passage therein.

Disposed within the interior of the housing is an electrically conductive deflectable member 16, such as a diaphragm, which is made of, for example, a thin metal foil. A stationary electrically conductive member (not shown) is disposed near the diaphragm. The deflectable member 16 is capable of deflecting in response to movement of a fluid against it. The two electrically conductive members thus form the moveable and fixed plates of an electrical capacitor. The sensor includes a detecting element for detecting the magnitude and direction of deflection of the deflectable member. An electrical transducing circuit (not shown) is electrically connected to the plates and detecting element and converts the deflection of the deflectable member 16 into electrical signals representative of the movement of the deflectable member in response to fluid pressure against it, and thus representative of the fluid pressure within the sensor.

The sensor also includes a fluid inlet 20 which permits passage of fluid from a fluid source (not shown) into the interior volume of the housing. The fluid inlet 20 defines a nominal fluid path from the fluid source outside the sensor to the deflectable member 16 within the sensor. Movement of the fluid through the sensor is complex, with variable velocities and pressures ranging from the molecular flow regime to laminar and turbulent flows.

The contaminant exclusion system of the present invention includes four principal components. A first contaminant collecting element 22 is disposed near the fluid inlet 20 and is adapted for collection of relatively large solid contaminants. The term "relatively large", as used herein, refers to solid particles having a size of greater than about 1000 to 2500 micrometers. The first contaminant collecting element 22 comprises an annular channel 24 (indicated by dotted lines) surrounding, and in fluid communication with, the fluid inlet 20. Fluid must pass through the annular channel in order to reach the deflectable member 16. The maximum dimension, typically the height, of the entrance to the annular channel 24 from the fluid inlet 20 is small relative to the diameter of the fluid inlet. Specifically, in a fluid sensor having a fluid inlet diameter of approximately 10,000 micrometers, the height of the entrance to the annular channel is not greater than, for example, about 2500 micrometers, so that solid contaminants greater than about 2500 micrometers in diameter cannot pass from the fluid inlet 20 into the annular channel 24 and are trapped within the fluid inlet 20. This dimension can be selected to exclude contaminants of varying size. In an alternate embodiment, the diameter of the fluid inlet is approximately 5000 micrometers and the entrance to the annular channel 24 is not smaller than about 1000 micrometers.

A second contaminant collecting element 26 is disposed between the fluid inlet 22 and the deflectable member 16 and is adapted for collection of intermediate solid contaminants. The term "intermediate", as used herein, refers to solid particles having a size of between about 250 and 2500 micrometers. The second contaminant collecting element 26 comprises (a) a baffle element 28 disposed in the fluid path between the fluid inlet and tie deflectable member, and (b) a trap element 30 which surrounds and is in fluid communication with the fluid inlet 20 via annular channel 24.

Figure 4:
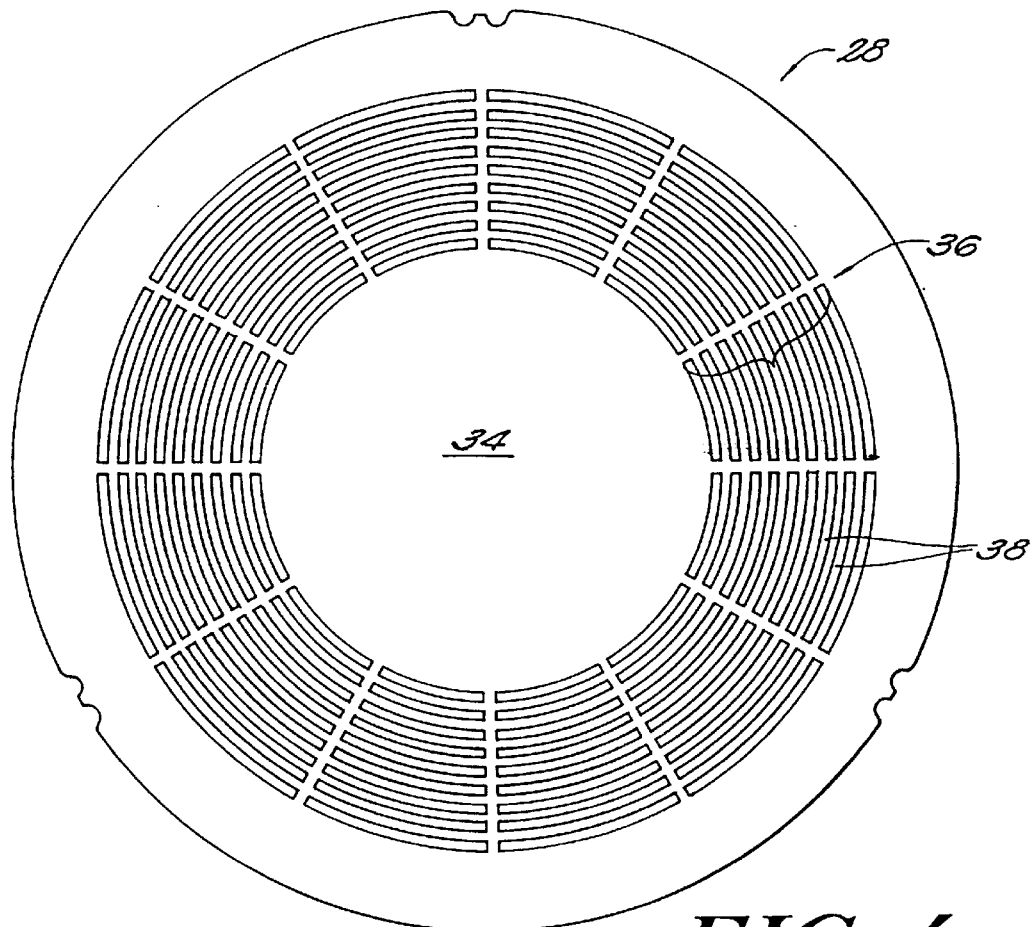
FIG. 4 is a plan view of the baffle element of the contaminant exclusion system.

The baffle element 28 is illustrated in greater detail in FIG. 4. It is a thin disk-shaped element made of a non-contaminating, corrosion-resistant material, such as stainless steel, nickel-based alloys such as, for example, Inconel alloys, or equivalent. As shown in FIG. 3, the baffle element 28 is disposed in the fluid path in a counterbore 32 in the housing of the sensor. The baffle element includes a central baffle portion 34 and a peripheral conductance portion 36, as shown most clearly in FIG. 4.

The central baffle portion 34 of the baffle element 28 has a diameter that is not less than, and preferably greater than, the diameter of the fluid inlet 20. When the baffle element 28 is installed in the sensor, it is interposed between the fluid inlet 20 and the deflectable element 16 so that the deflectable member is entirely blocked by the central baffle portion 34 with respect to the fluid inlet 20. This placement of the baffle element 28, and the sizing of the central baffle portion 34, prevent direct contact of the deflectable element 16 by any solid or non-solid fluid-borne particulates or contaminants. In addition, because the deflectable member 16 is located behind, or downstream relative to, the baffle element 28, it is not directly visible or accessible from the exterior of the sensor. Any attempts by operators or other users of the sensor to contact or dislodge the deflectable member via the fluid inlet are prevented.

The peripheral conductance portion 36 of the baffle element 28 is a circumferential fluid-permeable region surrounding the central baffle portion 34. It includes a plurality of radially spaced apertures 38, the size and spacing of which are preferably optimized to provide a fluid conductance through the baffle element 28 which is at least as great as the fluid conductance through the prior art baffle B shown in the portion of the sensor illustrated in FIG. 1. In a preferred embodiment, the radial dimension of the apertures 38 is at least as great as the thickness of the central baffle portion 34, but not greater than about 250 micrometers. Thus, any solid contaminants which are greater than about 250 micrometers in diameter will be prevented from passing through the apertures in the conductance portion of the baffle element 28 and will be trapped below, or upstream relative to, the baffle element 28.

The baffle element 28 is preferably made of a corrosion-resistant material, such as stainless steel, nickel-based alloys such as, for example, Inconel alloys, or equivalent, which has been photoetched to form the desired number and spacing of radial apertures. Other manufacturing methods for forming the apertures, such as, for example, laser etching, can be used. The baffle element 28 is preferably resistance welded in place in a counterbore in the housing in the fluid path between the fluid inlet 20 and the deflectable member 16.

The trap element 30 is illustrated most clearly in FIG. 3. It comprises a second annular collecting region which surrounds and is in direct fluid communication with the annular channel 24. When the baffle element 28 is disposed in counterbore 32 of the sensor housing, the peripheral conductance region 36 and the apertures 38 of the baffle element 28 are disposed quite near, and preferably directly downstream of, the trap element 30, as shown in FIG. 3. The radially spaced apertures 38, which are not greater than about 250 micrometers in width, act as a screen between the trap element 30 and the deflectable member 16 and prevent any fluid-borne solid contaminants greater than about 250 micrometers in diameter from contacting the deflectable member. Solid contaminants larger than about 250 micrometers in diameter which pass through the annular channel 24 from the fluid inlet 20 are thus collected in the trap element. A lip 40 on the side of the trap element 30 near the annular channel 24 facilitates collection of these intermediate particulate contaminants in the trap element 30 and also defines the size of the entrance to the annular channel 24, thus defining the particle size of contaminants that are excluded from the annular channel.

Figure 5:
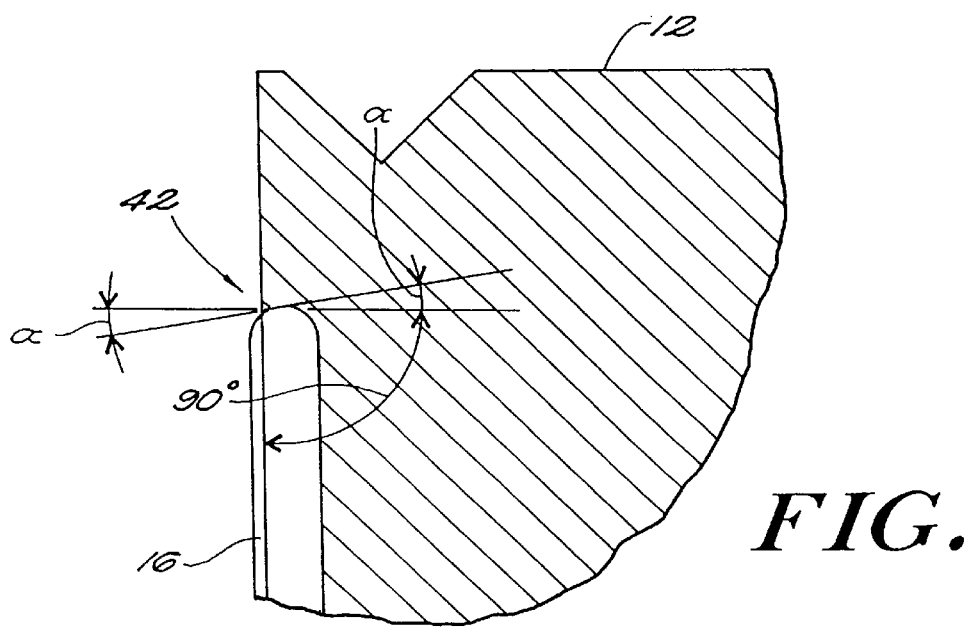
FIG. 5 is a detail view of the third contaminant collecting element of the contaminant excluding system of the sensor.

A third contaminant collecting element 42 is disposed near the deflectable member 16 and is illustrated best in FIG. 5. The third contaminant collecting element 42 comprises a contour imparted to a portion of the housing 12 at the location at which the deflectable member 16 is joined to the housing, as shown in FIG. 3 and in greater detail in FIG. 5. The contour of the housing at this location diverts relatively small solid contaminants away from the deflectable member so that they do not get wedged between the deflectable member and the housing. In a preferred embodiment, a portion of the housing 12 is caused to slope away from the deflectable member 16, such that the angle between the plane of the wall portion of the housing 12 and the plane of the deflectable member 16 at the location of their intersection is greater than 90 degrees. In particular, the interior of the housing 12 at the location of the deflectable member 16 is contoured by an angle $\alpha$ so that solid contaminants of less than about 250 micrometers in diameter accumulate away from the deflectable member 16 and not adjacent to it. In a preferred embodiment, the angle $\alpha$ of the contour in the wall of the housing is at least approximately 8 degrees from a nominally perpendicular angle, so that the angle between the plane of the wall portion of the housing and the plane of the deflectable member is at least approximately 98 degrees, as shown in FIG. 5.

The size of the fluid volume between the baffle element 28 and the deflectable element 16 at the location of the contour is greatly exaggerated for clarity in FIGS. 3 and 5. This fluid volume is relatively small and is shown in a more realistic scale in FIG. 6.

Figure 6:
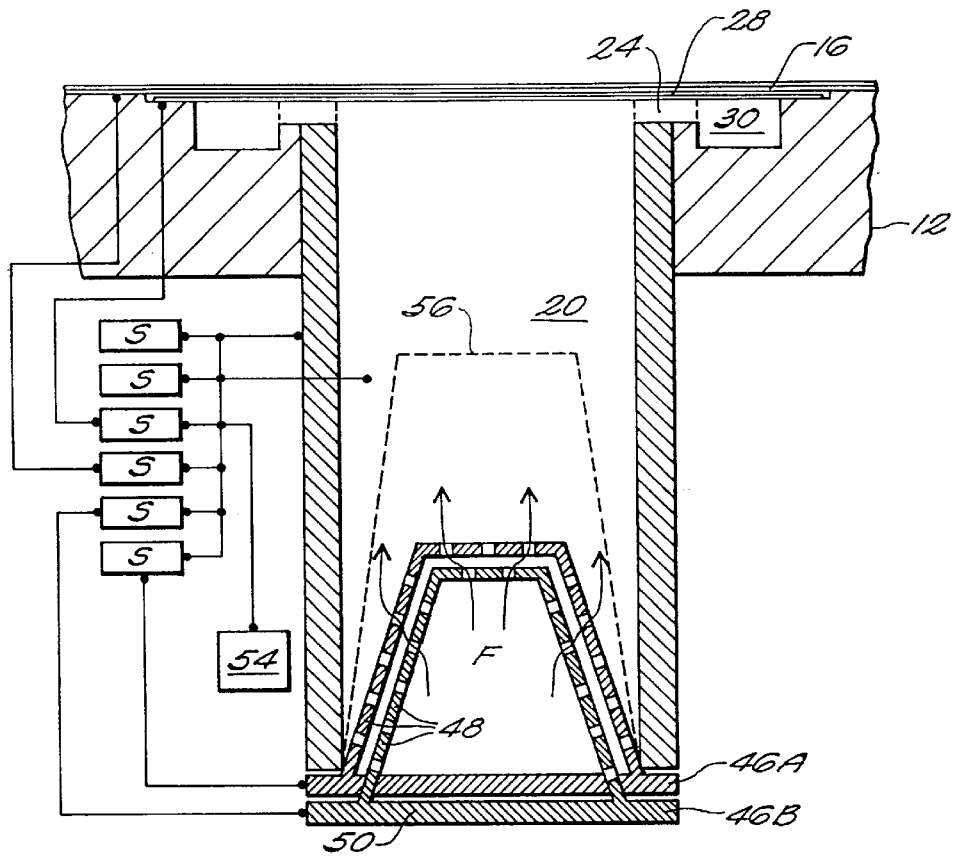
FIG. 6 is a cross-sectional view of a portion of a pressure sensor according to another aspect of the invention, in which the contaminant excluding system illustrated in FIG. 3 further includes a process vapor deposition inducing element.
Figure 7:
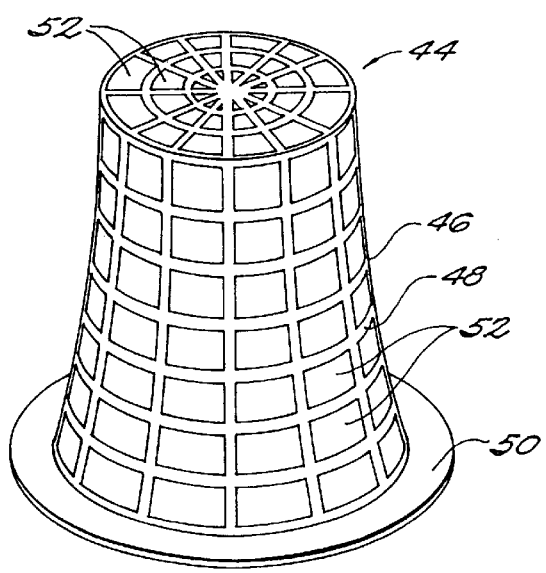
FIG. 7 is a perspective view of the process vapor deposition inducing element.

A fourth contaminant collecting element is disposed within the fluid inlet 20 and collects non-solid contaminants which deposit from process vapors in the fluid. A process vapor deposition inducing element 44 is illustrated in FIGS. 6 and 7. Deposition of process vapors on the deflectable member 16 adds weight to the deflectable member, thereby adversely affecting its response to fluid pressure on it. The process vapor deposition inducing element 44 is removably disposed within the fluid inlet 20 and is adapted to induce controlled and preferential deposition of process vapors in the fluid in the vicinity of the fluid inlet 20 and not on the deflectable member 16.

In a preferred embodiment, the process vapor deposition inducing element 44 comprises one or more temperature-controlled, thermally conductive deposition matrices 46 which define respective deposition surfaces 48 on which deposition of vapors in the fluid occurs. In a preferred embodiment, the deposition matrix 46 is in the form of an inverted cone or frustum of a cone which is adapted to fit within the fluid inlet, as shown in FIG. 6. A flange 50 around the base of the matrix abuts against the walls of the fluid inlet and allows the matrix to extend into the inlet 20 while keeping it relatively remote from the solid contaminant excluding elements further inside the sensor. Other shapes for the matrix which provide a relatively large surface area for vapor deposition are considered to be within the scope of the invention.

The deposition matrix 46 includes a plurality of apertures 52 which permit passage of the fluid therethrough, as indicated by arrows F in FIG. 6. A plurality of matrices 46A, 46B can be stacked within the fluid inlet 20, as shown in FIG. 6, in order to increase the total vapor deposition surface area. Each deposition matrix is preferably oriented at a slight angular or rotational offset from an adjacent matrix to provide a lengthened fluid flow path therethrough.

The deposition matrices 46 can form part of an electrical circuit which also includes, for example, a plurality of temperature sensors S for sensing the respective temperatures of the fluid F, the fluid inlet 20, the baffle element 28, the deflectable element 16, and the deposition matrices 46, and a controller 54 for controlling the temperature of the deposition matrices. An optional heater element (not shown) may be included. The deposition matrices 46 are preferably maintained at a temperature which is less than the temperature of the fluid passing therethrough and less than the temperature of the deflectable member 16, so that any deposition of vapors in the fluid which occurs in the system is preferentially induced on the deposition surfaces 48 of the deposition matrices instead of on the deflectable member 16. The sensors S and controller 54 can be connected in a feedback loop arrangement which corrects and maintains the desired temperature of the deposition surfaces 48. Any deposition of vapors in the fluid in the sensor is thus preferentially induced onto the deposition matrices 46 instead of onto the deflectable member 16, thus protecting the deflectable member from destruction, as well as changes in effective mass which would impact the accuracy of the sensor.

The deposition. matrixes 46 can be of any length which fits within the fluid inlet 20 of the sensor. Longer matrix lengths, illustrated in phantom by dashed line 56 in FIG. 6, permit the use of more matrixes in a nested configuration, as shown in FIG. 6, thus providing more surface area for vapor deposition, Because certain changes may be made in the above apparatus without departing from the scope of the invention herein disclosed, it is intended that all matter contained in the above description or shown in the accompanying drawings shall be interpreted in an illustrative and not a limiting sense.

I claim:

1. In a fluid pressure sensor including a housing, a deflectable member disposed within said housing, fluid inlet means for admitting a fluid into said housing and for defining a fluid path to said deflectable member, means for detecting the deflection of said deflectable member in response to impingement of said fluid against said deflectable member, and means for generating signals representative of the pressure of said fluid on said deflectable member, a system for shielding said deflectable member from contaminants in said fluid, said system comprising:

A. first contaminant collecting means near said fluid inlet means for collecting relatively large solid contaminants;

B. second contaminant collecting means between said fluid inlet means and said deflectable member for collecting solid contaminants of an intermediate size; and C. third contaminant collecting means near said deflectable member for collecting relatively small solid contaminants, wherein said first contaminant collecting means comprises an annular channel surrounding, and in fluid communication with, said fluid inlet means.

2. The system of claim 1, wherein the maximum dimension of the entrance to said annular channel from said fluid inlet means is small relative to the diameter of said fluid inlet means.

3. The system of claim 2, wherein for a diameter of the fluid inlet means of approximately 10,000 micrometers, the height of said entrance to said annular channel from said fluid inlet means is between about 1000 and 2500 micrometers.

4. The system of claim 1, wherein said second contaminant collecting means comprises:

A. baffle means disposed in said fluid path between said fluid inlet means and said deflectable member; and B. trap means surrounding, and in fluid communication with, said fluid inlet means.

5. The system of claim 4, wherein said baffle means includes a central baffle portion and a peripheral conductance portion, wherein the diameter of said central baffle portion is at least as great as the diameter of said fluid inlet means, wherein fluid impinging on said central baffle portion is prevented from impinging directly on said deflectable member.

6. The system of claim 5, wherein said peripheral conductance portion of said baffle means comprises a circumferential region including a plurality of radially spaced apertures therein.

7. The system of claim 6, wherein said apertures in said conductance portion of said baffle means have a radial dimension which is at least as great as the thickness of the central baffle portion.

8. The system of claim 7, wherein said radial dimension of said apertures is not greater than approximately 250 micrometers.

9. The system of claim 5, wherein said trap means is in direct fluid communication with said annular channel and said annular channel is in direct fluid communication with said fluid inlet means.

10. The system of claim 9, wherein said trap means is adapted for collecting solid contaminants having a size which is greater than the radial dimension of said apertures in said peripheral conductance portion of said baffle means.

11. The system of claim 10, wherein said solid contaminants collected within said trap means have a size between about 250 and 2500 micrometers.

12. In a fluid pressure sensor including a housing, a deflectable member disposed within said housing, fluid inlet means for admitting a fluid into said housing and for defining a fluid path to said deflectable member, means for detecting the deflection of said deflectable member in response to impingement of said fluid against said deflectable member, and means for generating signals representative of the pressure of said fluid on said deflectable member, a system for shielding said deflectable member from contaminants in said fluid, said system comprising:

A. first contaminant collecting means near said fluid inlet means for collecting relatively large solid contaminants;

B. second contaminant collecting means between said fluid inlet means and said deflectable member for collecting solid contaminants of an intermediate size; and C. third contaminant collecting means near said deflectable member for collecting relatively small solid contaminants, wherein said third contaminant collecting means comprises means near said deflectable member for diverting relatively small solid contaminants away from said deflectable member.

13. The system of claim 12, wherein said means for diverting relatively small solid contaminants away from said deflectable member comprises means for defining a contour of said housing near the location at which said deflectable member is disposed within said housing, wherein said housing at said location near said deflectable member slopes away from said deflectable member.

14. The system of claim 13, wherein said housing at said location near said deflectable member is contoured such that the angle between said housing and said deflectable member is greater than 90 degrees.

15. The system of claim 14, wherein said angle is approximately 98 degrees.

16. The system of claim 13, wherein said relatively small solid contaminants have an average size of not greater than about 250 micrometers in diameter.

17. In a fluid pressure sensor including a housing, a deflectable member disposed within said housing, fluid inlet means for admitting a fluid into said housing and for defining a fluid path to said deflectable member, means for detecting the deflection of said deflectable member in response to impingement of said fluid against said deflectable member, and means for generating signals representative of the pressure of said fluid on said deflectable member, a vapor deposition inducement system, comprising:

A. vapor deposition inducing means removably disposed within said fluid inlet means for inducing deposition of vapors in said fluid within said fluid inlet means and preventing deposition of said vapors on said deflectable member, wherein said vapor deposition inducing means comprises:

A. one or more thermally conductive deposition matrices having respective deposition surfaces, wherein said deposition matrices include a plurality of apertures for passage of said fluid therethrough;

B. means for determining the respective temperatures of said fluid, said fluid inlet, said deflectable member, and said deposition matrices and for generating signals representative of said respective temperatures;

C. means associated with said deposition matrices for controlling the temperature thereof; and D. feedback means associated with said controller for comparing the respective temperatures of said fluid, said fluid inlet, said deflectable member and said deposition matrices and for providing a signal to said temperature controller for adjusting the temperature of said deposition matrices to a desired temperature which is less than the temperatures of said fluid and said deflectable member.

18. The system of claim 17, wherein the temperature of said deposition surfaces is sufficiently low, relative to the temperature of said fluid and said deflectable member, to induce deposition of said vapors onto said deposition surfaces instead of on said deflectable member.

19. The system of claim 17, further comprising a system for shielding said deflectable member from solid contaminants in said fluid, said system including:

A. first contaminant collecting means near said fluid inlet means for collecting relatively large solid contaminants;

B. second contaminant collecting means between said fluid inlet means and said deflectable member for collecting solid contaminants of an intermediate size; and C. third contaminant collecting means near said deflectable member for collecting relatively small solid contaminants.

* * * * *